Jan. 26, 1954     W. J. F. FORWARD     2,667,356
HYDRAULIC CHUCK Filed March 29, 1952     4 Sheets-Sheet 1

INVENTOR.
WORTHY J. F. FORWARD
BY
ATTORNEY

Jan. 26, 1954

W. J. F. FORWARD 2,667,356

HYDRAULIC CHUCK

Filed March 29, 1952

INVENTOR.
WORTHY J. F. FORWARD
BY
ATTORNEY

Jan. 26, 1954     W. J. F. FORWARD     2,667,356
HYDRAULIC CHUCK Filed March 29, 1952     4 Sheets-Sheet 4

INVENTOR.
WORTHY J. F. FORWARD
BY
ATTORNEY

Patented Jan. 26, 1954

2,667,356

UNITED STATES PATENT OFFICE 2,667,356

HYDRAULIC CHUCK

Worthy J. F. Forward, Rochester, N. Y., assignor to Consolidated Machine Tool Corporation, Rochester, N. Y., a corporation of Delaware Application March 29, 1952, Serial No. 279,384

24 Claims. (Cl. 279—4)

The present invention relates to chucking mechanisms, and more particularly to a chucking mechanism suitable for use on an axle lathe.

Axle lathes are designed for turning and other operations upon car wheel axles, and other shafts. The workpieces, as they come to an axle lathe, are very rough forgings, varying considerably in diameter and having varying amounts of eccentricity at the point where they are to be chucked, even for axles or shafts that are all to be of the same prescribed finished diameter.

Eccentricity of the work, in particular, has heretofore always presented a difficult chucking problem. The rough forged axles come with eccentricity or runout at the chucking point as much as one-half inch. Previous designs of chucks have centered the work and the entire chucking assembly, weighing several hundred pounds in the case of an axle lathe, on the eccentric part of the axle, resulting in an unbalanced condition when the axle is revolved in operation of the lathe. This always has a tendency to cause chatter and vibration, but at the speed required for efficient operation of carbide tipped tools, the chatter and vibration developed, when considerable runout has been encountered, has frequently been so bad that such tools could not be used. In any event, the vibration and chatter resulting from eccentric chucking of the work always tends to shorten the life of any tool used in the lathe and produce an unacceptable finish on the turned surface of the axle.

Another disadvantage of previous designs of chucking mechanisms, resulting where the work is eccentric at the point of chucking, is that the unbalanced weight of the chuck causes the axle to run in a downwardly-bowed condition at low speeds, the work tends to oscillate or gyrate as speed is increased. The net result is to produce axles having both taper and eccentricity in their finished turned surfaces.

One object of the present invention is to provide a chucking and work-driving mechanism for an axle lathe which will readily adapt itself to the variations in diameter and eccentricity of the workpieces that are encountered in everyday practice.

Another object of the invention is to provide a chucking and work driving mechanism of the character described with which the work will be held securely regardless of variations in diameter or eccentricity.

Another object of the invention is to provide a chucking mechanism of the character described which may be used for chucking and handling work of a wide range of diameters.

Another object of the invention is to provide a chucking mechanism which is capable of freely adjusting itself to compensate for variation in diameter and eccentricity of a workpiece.

A further object of the invention is to provide a chucking mechanism which is capable of freely adjusting itself to compensate for variation in diameter and eccentricity of different workpieces but which under driving load ends to lock itself in gripping engagement with the work more or less in proportion to the driving force being transmitted, thus preventing vibration or chatter of the workpiece during the turning operation.

Another object of the invention is to provide a chucking mechanism having a plurality of angularly-spaced chucking jaws capable of simultaneously gripping the work at angularly-spaced points around the periphery of the work and which is hydraulically actuated in such way that the pressure will be equalized on the several jaws irrespective of variations in diameter or eccentricity of successive workpieces, and all of these jaws will securely grip the work simultaneously and with equal pressure regardless of such variations in diameter or eccentricity, thus assuring that the finished work will come from the lathe with its turned surface free from eccentricity or taper.

Another object of the invention is to provide a chucking mechanism of the character described which is self energizing, and will thus maintain a driving pressure always greater than that required to pull the cut.

A further object of the invention is to provide a chucking mechanism of the character described which is manually controllable and which, under manual control, will quickly move to and from operating position.

Another object of the invention is to provide a chucking mechanism having a plurality of chucking jaws which are held in chucking position under hydraulic pressure and which are movable to and from chucking position by manipulation of a brake lever so that said chucking jaws are retracted or moved inwardly into work-engaging position by a simple manual movement of the brake lever.

Still another object of the invention is to provide a multi-jawed chucking mechanism of the character described in which there will be a minimum of unbalanced weight so that the lathe may be operated without vibration at the high speeds required for efficient use of carbide tools.

A further object of the invention is to provide a hydraulically-actuated chucking mechanism having means for returning the chucking jaws to inoperative position when the work is unchucked, which will also serve to keep air out of the hydraulic system.

Another object of the invention is to provide a chucking mechanism of the character described which is so constructed that it is protected from damage by the workpieces in loading and unloading the machine.

A further object of the invention is to provide a chucking mechanism of the character described in which more loading clearance is provided than in chucking mechanisms of previous constructions.

A further object of the invention is to provide a chucking mechanism of the character described in which the chucking mechanism is so mounted upon the spindle of the axle lathe that there is no motion between the chuck body and the spindle nose of the lathe.

Still another object of the invention is to provide a chucking mechanism of the character described in which resilient stops are provided to stop the movement of the chucking jaws to chucking position, thereby to prevent damage or shock to the chucking mechanism in event that it should be actuated to chucking position and no work be in the machine.

Another object of the invention is to provide a chucking mechanism in which resilient stops are provided not only for cushioning the closing but also the opening movement of the chucking jaws.

Another object of the invention is to provide a chucking mechanism of the character described which is thoroughly protected so that there are no places for dust or dirt to accumulate.

Another object of the invention is to provide a chucking mechanism of the character described which will permit provision of openings all around the work so that dust or scale released by the chucking operation may readily get out of the mechanism.

Still another object of the invention is to provide a chucking mechanism of the character described having removable chuck jaws with serrated, arcuate work-engaging faces which is so constructed that the chuck jaws may be removed, so that chuck jaws of an arcuate shape suitable for the particular finished diameter of the work which is to be handled, may be substituted therefor.

A further object of the invention is to provide a chucking mechanism of the character described in which different length jaws may be used for different sizes of axles thereby to keep the normal clamped position of each jaw approximately halfway between the two pistons which hold each jaw in work-engaging position under pressure to avoid undue cocking or side strain on the master piston of the pair and thus prolong the life of the piston fit, and thereby requiring the operator to check and maintain this approximately central position, which automatically maintains the correct amount of oil in the hydraulic system.

A still further object of the invention is to provide a chucking mechanism of the character described which will be mechanically simple in construction, and easy to keep in order.

Other objects of the invention will be apparent hereinafter from the specification and from the recital of the appended claims.

Figure 2:
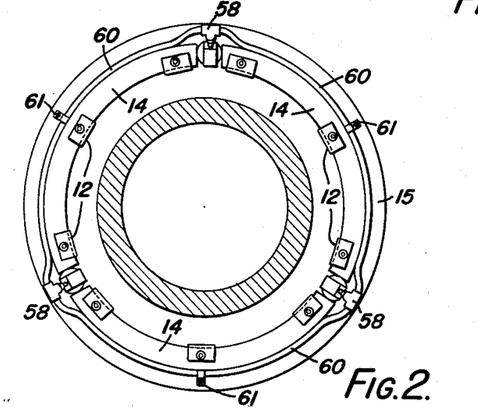
Fig. 2 is a rear elevation thereof on a considerably reduced scale.
Figure 4:
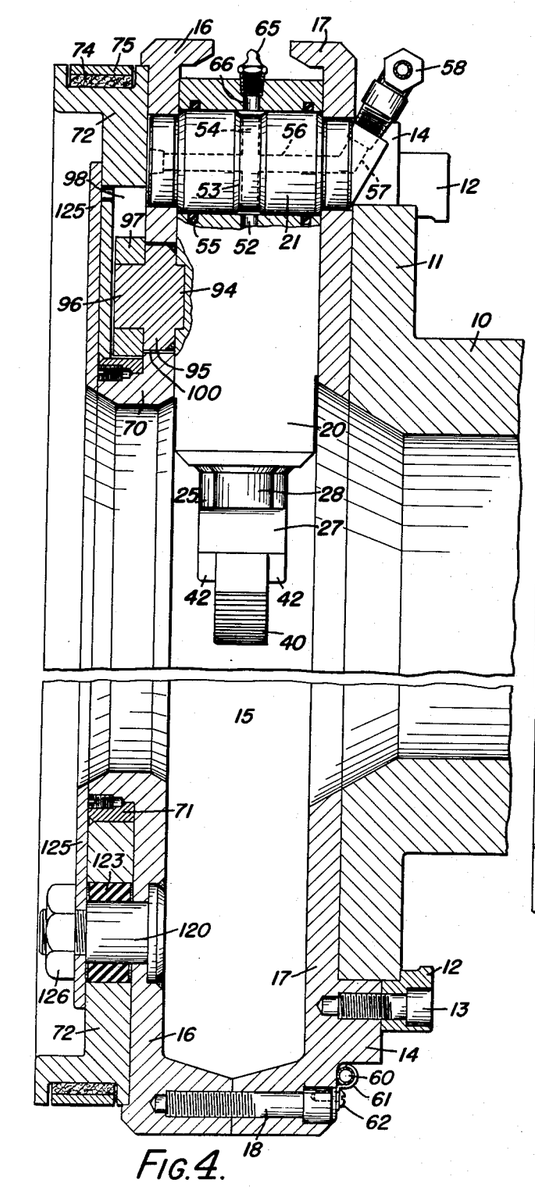
Fig. 4 is a fragmentary section taken at right angles to Fig. 1 through the chucking mechanism and the work spindle of the lathe.

Referring now to the drawings by numerals of reference, 10 (Fig. 4) denotes the drive spindle of an axle lathe, and 11 is the nose of this spindle. Fastened to the nose 11 of the spindle 10 by plates or gibs 12 (Figs. 2 and 4) and screws 13 is a housing 15 comprising the two cylindrical plates 16 and 17 which are secured together by screws 18. The housing is formed on its rear face with angularly-spaced arcuate ribs 14 and the lugs or gibs 12 are secured to these ribs 14 by the screws 13.

Pivotally mounted in the housing 15 are a plurality of supports 20 (Figs. 3 and 4), three in the embodiment shown. Each of these supports pivots on a trunnion 21 that is journaled at opposite ends in the side plates 16 and 17 of the housing.

Figure 3:
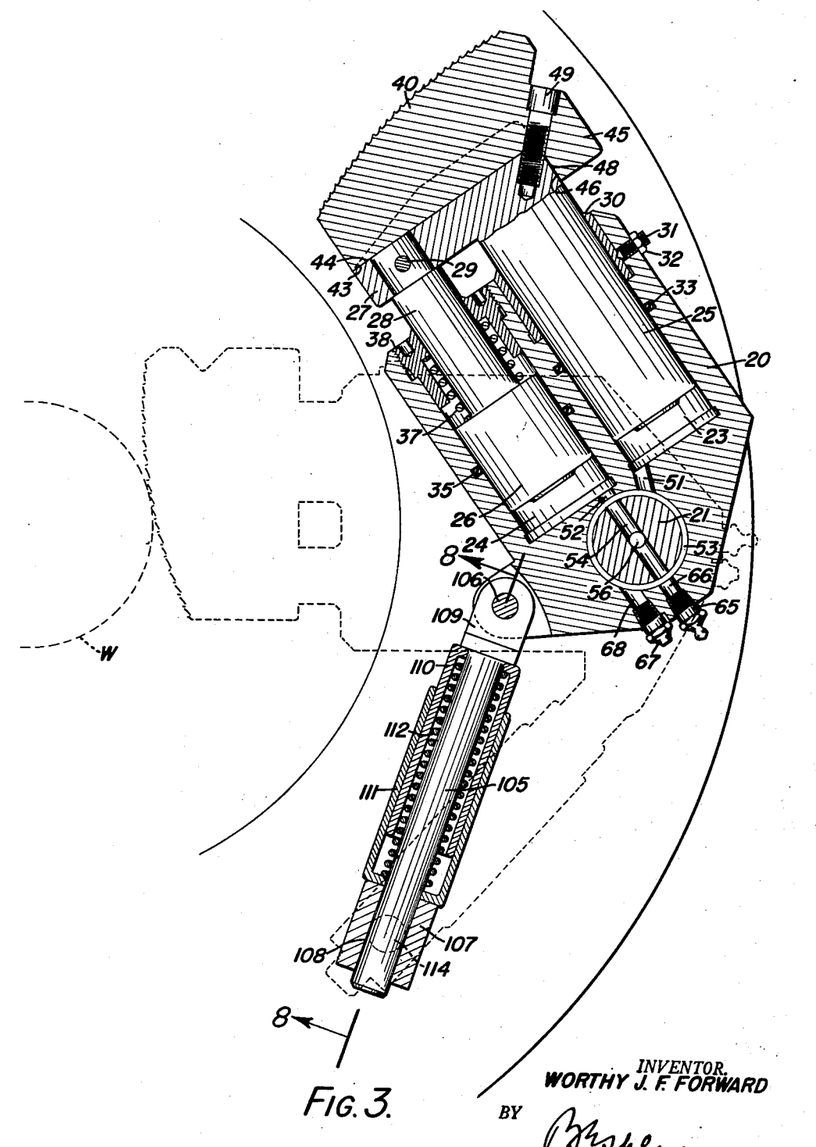
Fig. 3 is a section, on an enlarged scale, through one of the chucking units of the chucking mechanism, and through the means for actuating the same, and showing in full lines the chuck jaw swung to inoperative position, and in dotted line one operative position thereof.

Each support 20 is provided with a pair of parallel cylindrical chambers 23 and 24 (Fig. 3). Mounted to reciprocate in these two chambers are pistons 25 and 26, respectively. The piston 25 is a solid bar. It is of uniform diameter for the length thereof that travels in the cylinder 23. It is formed at its front end, exteriorly of the cylinder 23, with a head 27 that is adapted to carry a chuck jaw. The piston 26 is of reduced diameter toward its forward end providing a piston rod 28 which is further reduced in diameter adjacent its forward end, and is secured to the head 27 by a pin 29.

A guide and seal member 30 is secured in the front end of the cylinder 23 by a set screw 31 which is secured in position by the nut 32. A standard O ring 33 is mounted in a groove in the wall of the cylinder 23 to surround the piston 25 to prevent leakage of the hydraulic motive fluid from the cylinder. Similarly an O ring 35 is mounted in a groove in the wall of the cylinder 24 to prevent leakage along the piston 26. The piston 26 is constantly urged rearwardly in its cylinder 24 by a coil spring 37 which surrounds the reduced diameter portion 28 of the piston and which is interposed between the head of the piston and a guide and closure 38 that is threaded into the outer end of the cylinder 24.

Figure 7:
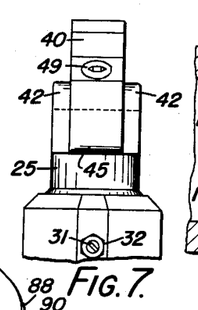
Fig. 7 is a fragmentary view looking at the front end of one of the chucking jaws and showing its mounting.

Each piston head 27 has a groove extending across its front which is bounded by the parallel side walls 42 (Fig. 7). In the groove of each piston head 27 there is removably secured a chuck jaw 40. The walls 42 which bound the groove serve to hold the chuck jaw against lateral displacement. The inner plane face 43 (Fig. 3) of each chuck jaw is adapted to seat against the plane bottom surface 44 of the groove in the associated piston head 27. Each chuck jaw is further provided with a depending rear seating portion 45 which has a plane surface 46 extending at right angles to surface 43 and adapted to seat against the lateral seating surface 48 of the associated piston head 27. The surfaces 44 and 48 of each piston head extend at right angles to one another.

Each chuck jaw 40 is removably secured to the associated piston head 27 by a screw 49 which passes through a hole in the chuck jaw and which threads into an aligned hole in the piston head. The axis of these holes and of screw 49 bisects the angle between the surfaces 43 and 46 of the chuck jaw and between the associated surfaces 44 and 48 of the associated piston head 27. When a chuck jaw 40 is seated in the groove in a piston head 27, therefore, and the screw 49 is threaded up, the chuck jaw is held securely in position on the piston head with its surfaces 46 and 43 seated securely against the piston head, both surfaces simultaneously being drawn into seating contact with the piston head surfaces 48 and 44.

The several cylinders 23 and 24 of the several carriers 20 are connected together in a closed hydraulic system. There are ducts 51 and 52 formed in each carrier 20, communicating, respectively, with the cylinders 23 and 24 of the carrier. The ducts 51 and 52 of each carrier also communicate with a peripheral groove 53 formed in the pin 21 on which that carrier is pivoted. Each duct 53 communicates with a duct 54 that extends diametrically through the trunnion pin 21. Each duct 54 communicates with a duct 56 that extends axially of the pin 21. Each duct 56 communicates through an angular duct 57 (Fig. 4) with a fitting 58.

The several fittings 58 of the several carriers 20 are connected to one another by tubing 60 (Figs. 2 and 4) which is secured against the rear face of the housing 15 by clamps 61. These are fastened in position by screws 62. The several cylinders 23 and 24, therefore, form parts of a closed hydraulic system. Hence, when this system is filled with the hydraulic motive fluid, the pressure on the several pistons 25 and 26 tends to be equalized; and there is no unbalanced pressure.

The system can be kept filled by forcing oil with an Alemite gun into the system through a conventional fitting 65 (Figs. 3 and 4) that is threaded into one of the carriers 20 and that communicates with a radial duct 66 which in turn communicates with the groove 53 in the periphery of the trunnion pin 21 on which that particular carrier 20 swings. Any air entrapped in the system can be exhausted therefrom through a conventional valve 67 (Fig. 3) which is threaded into a duct 68 in one of the carriers 20. Duct 68 communicates with the groove 53 in the pin 21 on which that carrier swings.

Figure 5:
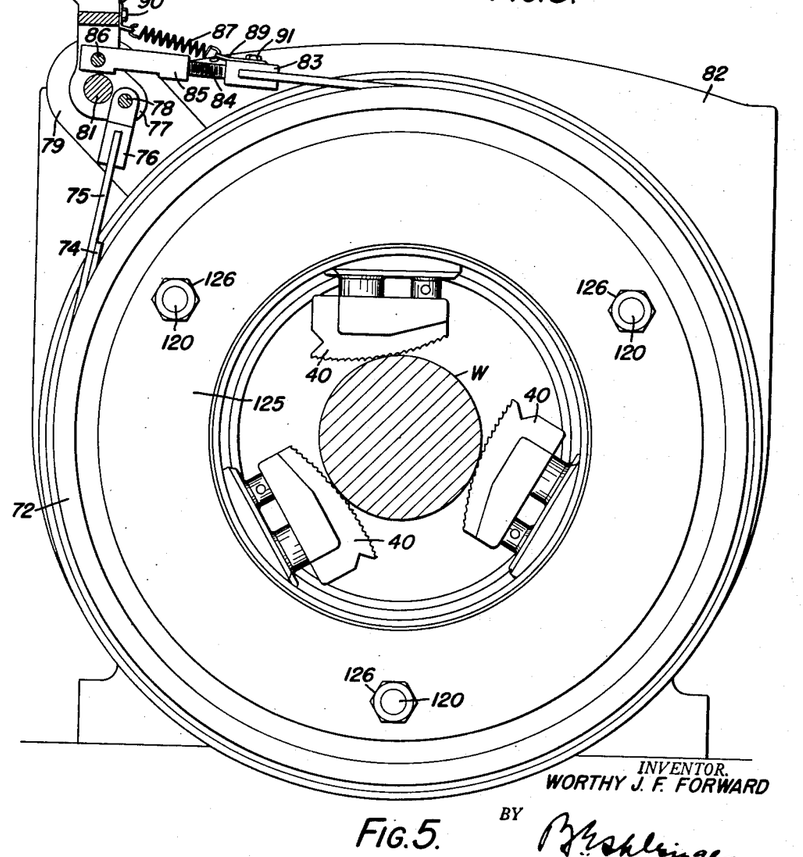
Fig. 5 is a front elevation of the chucking mechanism.

The front section 16 of the housing 15 is formed with a bearing portion 70 (Fig. 4) on the periphery of which there is fastened a cylindrical bronze ring or bushing 71. Journaled on this ring is a brake drum 72 which has a peripheral groove therein which is adapted to cooperate with a brake band 74. The brake band is secured to a flexible brake strap 75 (Fig. 5). This strap is pivotally connected at one end by means of a clamp 76 and a pin 78 with the short arm of a bell crank lever 77. This lever is pivotally mounted upon a stud 81 (Figs. 5 and 6) that is mounted in a lug 79 which forms part of the spindle housing 82 of the machine. The other end of the brake strap 75 is connected by a clamp 83 with a screw 84 that threads into a coupling member 85 that is pivotally mounted at 86 on a brake lever 80.

Figure 6:
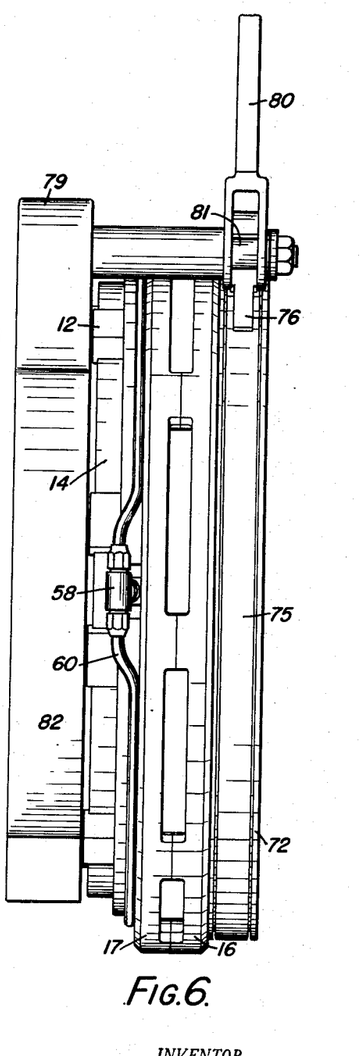
Fig. 6 is a side elevation thereof.

The lever 80 is pivoted on stud 81. It is adapted to be moved manually in one direction by the operator of the machine. It is constantly urged in the opposite direction by a coil spring 87 that is fastened at one end to the lever 80 by a clip 88 and that is fastened at its other end to the clamp 83 by the clip 89. Screws 90 and 91 serve to secure the respective clips 88 and 89 in position.

The brake drum 72 is connected to each carrier 20 by an eccentric pin and block connection. Each such connection includes a pin 95 (Fig. 4) which has a portion 94 seated in the associated carrier 20 and welded or otherwise fixedly secured to that carrier, or integral with the carrier. The main body portion of each pin 95 extends through an arcuate slot 100 (Figs. 1 and 4) in housing wall 16. Each pin 95 also has a projecting portion 96 on which is mounted a square block 97. Each block 97 is adapted to slide in a rectangular slot 98 formed in the brake drum and extending generally radially thereof.

The housing 15 rotates with the work spindle 10 of the machine when the machine is in operation. When the operator pulls the brake lever 80 downwardly, therefore, to apply brake pressure to the brake drum 72, the brake drum is held against rotation relative to the housing 15. Consequently through the pin and block connection between the brake drum and the carriers 20, the carriers 20 are swung inwardly to bring the chuck jaws into clamping engagement with the work. In this movement the blocks 97 travel in the slots 98, while the cylindrical main portions of the pins 95 travel in the arcuate slots 100 in the housing wall 16.

Figure 8:
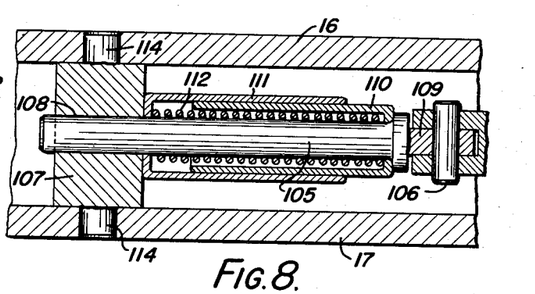
Fig. 8 is a section on the line 8—8 of Fig. 3, looking in the direction of the arrows.

Each jaw is locked in or out of operative position by a toggle linkage comprising a rod 105 (Figs. 3 and 8) which has a lug 109 projecting therefrom that is pivotally connected by a pin 106 with the associated carrier 20. Each rod 105 slides in a hole 108 in a knuckle member 107 that is pivotally mounted by means of trunnions 114 in the side walls 16 and 17 of the housing 15. Each rod 105 carries a sleeve 110 which is slidable in a sleeve 111. Between the two sleeves is interposed a coil spring 112. The toggle spring 112 holds the jaws open or closed against any size axle.

The swinging movement of the carriers 20 inwardly or outwardly is limited by stop pins 120 (Figs. 1 and 4) which have enlarged heads that are welded in the side plate 16 of the housing 15 and which pass through arcuate slots 122 in the brake drum 72. A rubber ring 123 surrounds each stop pin 120 which acts as a bumper against the end of the associated slot 122 to cushion the stoppage of swing of the associated carrier. The stop pins 120 serve to limit inward and outward movement of the carriers 20. They prevent the jaws from being closed too far and damaging one another if the brake should accidentally be applied when there is no work in the machine. They prevent the jaws from being swung out beyond practical limits.

A hardened steel plate 125 (Fig. 4) is secured over the brake drum 72 and the outside edge of the wall member 16 by nuts 126 that thread onto the studs 120. The plate 125 serves as a bumper plate to prevent damage to the brake drum or to part 16 during insertion of the work or removal of the work from the machine.

The jaws 40 are, as shown, serrated to firmly grip the work. Each is arcuately curved on its outer face about an axis offset from the pivotal axis 21 of its carrier.

Figure 1:
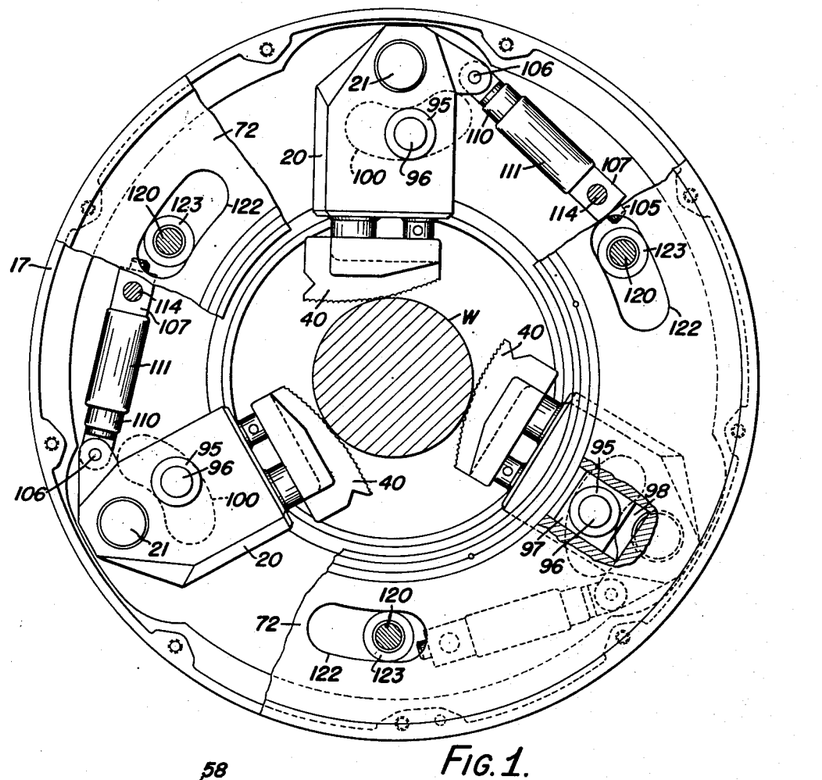
Fig. 1 is a partial front elevation, with parts broken away, showing a hydraulic chucking mechanism constructed according to one embodiment of this invention in operative position.

In operation, the work rotates clockwise with reference to Figs. 1 and 5.

In a turning operation, the pressure of the stationary cutting tool against the revolving work tends to stop the rotation of the work. Since the toothed jaws 40 are curved eccentrically with relation to their respective pivots 21, they act like cam surfaces; and the cutting thrust of the tool on the work, therefore, tends to close the carriers 20 in toward the center of rotation. Since the brake drum or ring 72 compels all the carriers 20 to move in unison, the force of the cut tends to push each piston assembly 25, 26 outward against the oil or other liquid in the hydraulic system. Since this oil is free to flow in a closed circuit connecting all the cylinders 23, 24 together, it follows that whichever jaw 40 contacts the work first, when the chuck is closed, forces the hydraulic liquid to the other cylinders causing all the jaws 40 to move in and contact the work. Pressure in the hydraulic system is thus maintained by and in proportion to the force of the cut, and must always be exactly equal in all the cylinders.

The jaws are made interchangeable so that jaws of appropriate length can be used on each job, that is, for different diameters of work. The object is to keep the center of each jaw in its clamped position approximately half way between the two pistons 25 and 26 to avoid undue side strains on the master piston 25 thus prolonging the life of the piston fit and the smoothness of the surface which contacts the O-ring 33.

The use of the two pistons 25 and 26 has a two-fold advantage. If a single piston were employed some key or gib would have to be provided to prevent the piston being turned in its cylinder under the cutting torque of the tool upon the work in the operation of the machine. Piston 26 in effect serves as a key or guide for the master cylinder 25, and is much more effective than any key or gib would be. Moreover, by using two pistons the diameters of both can be much less than the diameter that would be required if a single piston were used for each jaw. This makes the chucking mechanism much more compact, and allows more space for loading or unloading the work from the machine.

The toggle linkages hold the jaws resiliently in operating position until the chuck housing 15 has rotated far enough relative to the brake drum 72 to throw the toggles beyond dead center. Then the toggles move the jaws and their carriers quickly to inoperative position. The toggle linkages have a two-fold function. In the unchucked or open position of the chucking mechanism they hold each carrier 20 in the fully open position. When closed upon any size axle they hold the teeth of each of the eccentric or cam-shaped jaws 40 in contact with the axle in such way that when the force of cutting tends to prevent the axle from revolving these teeth bite into the axle and transmit the cutting force to the pistons 25—26 and to the ring or drum 72 causing the equalizing pressure through the closed hydraulic system to vary in proportion to the size of the chips being taken by the tool.

To move the jaws to gripping position the work spindle of the machine is driven in the direction for turning, clockwise in Figs. 1 and 5, and the brake drum 72 is braked. To move the jaws to retracted position, the work spindle of the machine is driven in the opposite direction and the brake drum 72 is again braked. All that is required to move the jaws to operating position or to retract them is a slight manual pressure on the brake lever 80. The chuck is self-energizing.

In actual use, the chuck of the present invention has been operated at the maximum speeds used for turning axles with any type tool and with axles having the maximum allowable runout, without any vibration whatever being produced. With the chuck of the present invention, the major part of the weight revolves about the axis of the work spindle in a perfectly balanced condition whether the jaws are open or closed. Moreover, because of the centering action of the chuck, all difficulties regarding eccentricity or taper in the turned surfaces of the finished work are eliminated. The chuck, furthermore, prevents chatter and extends materially the life of lathe tools.

I have heretofore provided a chuck, which is compact, easily operable, and self-energizing, which will readily accommodate itself to the variations in diameter and eccentricity that are always encountered where rough forgings are to be machined, and which will aid in producing improved work.

While a specific embodiment of the invention has been described, it will be understood that the invention is capable of further modification, and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A chuck comprising a housing adapted to be secured to the work spindle of a machine to rotate with said work spindle, a plurality of carriers pivotally mounted in said housing, a member reciprocably mounted in each carrier, a work-gripping jaw mounted on each such member and having a gripping surface eccentric of the pivotal axis of the associated carrier, means for pressing said members in one direction to move the jaws into work-engaging positions and for equalizing the pressure on the several members, a brake drum rotatably mounted on said housing, a brake cooperating with said brake drum, and means connecting said brake drum to said carriers to move said carriers about their pivots in opposite directions in accordance with the direction of movement of said brake drum relative to said housing upon application and release, respectively, of said brake.

2. A chuck comprising a housing adapted to be secured to the work spindle of a machine to rotate with said work spindle, a plurality of carriers pivotally mounted in said housing, a member movably mounted in each carrier, a work-gripping jaw secured to each said member, means for applying fluid-pressure to each said member to hold the jaw in gripping engagement with the work under pressure, a member rotatably mounted on said housing, means operatively connecting the last-named member to said carriers to swing said carriers about their pivots on movement of said member in opposite directions, respectively, relative to said housing, thereby to move the jaws into work-engaging position and to retract them therefrom, respectively.

3. A chuck comprising a housing adapted to be secured to the work spindle of a machine to rotate with said work spindle, a plurality of carriers pivotally mounted in said housing, a member movably mounted in each carrier, a work-gripping jaw secured to each said member, means for applying fluid-pressure to each said member to hold the associated jaw in gripping engagement with the work under pressure, a brake drum rotatably mounted on said housing, a brake engageable therewith, means operatively connecting said brake drum to said carriers to swing said carriers about their pivots on movement of said brake drum in opposite directions, respectively, relative to said housing, thereby to move the jaws into work-engaging position and to retract them therefrom, respectively, and means for manually applying said brake to said brake drum to effectuate relative rotation between said drum and said housing.

4. A chuck comprising a housing, a plurality of carriers pivotally mounted in said housing, a support movable relative to said housing, a cylinder in each carrier, a piston reciprocable in each cylinder, a work-gripping jaw secured at the outer end of each piston and having a work-engaging surface eccentric of the pivotal axis of the associated carrier, means connecting the several cylinders to one another in a closed hydraulic system, means operative by movement of said support relative to said housing for moving the several carriers simultaneously into operative position and for simultaneously retracting the several carriers therefrom, and means for effecting such relative movement between the support and the housing.

5. A chuck comprising a housing adapted to be secured to the work spindle of a machine to rotate with said work spindle, a member mounted on said housing to be rotatable relative thereto, a plurality of carriers movably mounted in and relative to said housing, a cylinder in each carrier, a piston reciprocable in each cylinder, a work-gripping jaw secured at the outer end of each piston, means connecting the several cylinders to one another in a closed hydraulic system, means operatively connecting said member to all of said carriers to move said carriers in opposite directions, respectively, on rotation of said member relative to said housing in opposite directions, and means for effecting relative rotary movement between said member and said housing.

6. A chuck comprising a housing, a plurality of carriers pivotally mounted in said housing for movement to and from operative position, a pair of parallel cylinders in each carrier, a piston reciprocable in each cylinder, a work-gripping jaw secured to the corresponding ends of each pair of pistons, each jaw having an arcuate work-engaging surface eccentric of the pivot of the associated carrier, means for supplying a hydraulic fluid to the opposite ends of each pair of pistons, means for confining said fluid to apply pressure on said pistons, and means for moving said carriers simultaneously into operative position.

7. A chuck comprising a housing, a plurality of carriers movably mounted in said housing, a work-gripping jaw movably mounted in each carrier, means for applying fluid-pressure to resist movement of each of said jaws away from work-engaging position, all said fluid-pressure applying means forming part of a closed hydraulic system, and means for simultaneously moving all said carriers to move all said jaws simultaneously into and out of operative relation with the work depending on the direction of movement of said carriers.

8. A chuck comprising a housing adapted to be secured to the work spindle of a machine to rotate with said work spindle, a member mounted on said housing to be rotatable relative thereto, a plurality of carriers pivotally mounted in said housing for movement to and from operative position, a pair of parallel cylinders in each carrier, a piston reciprocable in each cylinder, a work-gripping jaw secured to each pair of pistons, each jaw having an arcuate work-engaging surface eccentric of the pivot of the associated carrier, each jaw being positioned so that when it is in work-engaging position it is centered lengthwise approximately half way between the pistons to which it is secured, means for connecting all said cylinders in a closed hydraulic system, means operatively connecting said member to said carriers to move said carriers in opposite directions, respectively, on rotation of said member relative to said housing in opposite directions, and means for effecting relative rotary movement between said member and said housing.

9. A chuck comprising a housing, a plurality of carriers pivotally mounted in said housing, each carrier having a pair of seating surfaces disposed at right angles to one another, a work-gripping jaw having a pair of seating surfaces disposed at right angles to one another and adapted to seat, respectively, against the seating surfaces of said carrier, means for removably securing each jaw to its associated carrier comprising a threaded member passing through said jaw and threading into said carrier in a direction bisecting the angles between the seating surfaces of both the jaw and the associated carrier, each jaw having an arcuate work-engaging surface eccentric of the pivot of the associated carrier, and means for rocking said carriers about their pivots in opposite directions to move the jaws simultaneously into operative relation with the work and to simultaneously retract the carriers therefrom.

10. A chuck comprising a housing, a plurality of carriers pivotally mounted in said housing, a work-gripping jaw mounted reciprocably on each carrier for rectilinear movement in a direction radial of the pivotal axis of the associated carrier, each said jaw having a work-gripping surface eccentric of the pivotal axis of its carrier, means for rocking said carriers about their pivots in opposite directions, respectively, to move the jaws simultaneously into operative relation with the work and to simultaneously retract the carriers therefrom, and means for resisting movement of each jaw away from work-engaging position and for distributing the pressure tending to move any jaw away from work-engaging position to the other jaws to tend to move them toward work-engaging position.

11. A chuck comprising a housing, a plurality of carriers pivotally mounted in said housing, a work-gripping jaw mounted reciprocably on each carrier, means for pressing the several jaws into work-engaging position, means for equalizing the pressure on the several jaws, and means for rocking said carriers about their pivots in opposite directions to move the jaws simultaneously into operative relation with the work and to simultaneously retract the carriers therefrom, and means forming part of said rocking means for releasably locking each carrier in operative position.

12. A chuck comprising a housing, a plurality of carriers pivotally mounted in said housing, a work-gripping jaw mounted reciprocably on each carrier, means for exerting equal pressure on the several jaws to urge them into and hold them in work-engaging position, and means for rocking said carriers about their pivots in opposite directions to move the jaws simultaneously into operative relation with the work and to simultaneously retract the carriers therefrom, said rocking means comprising a spring-actuated toggle pivotally connected at one end to each carrier and pivotally connected at its opposite end to said housing for releasably locking each carrier in and out of operative position.

13. A chuck comprising a housing, a plurality of carriers pivotally mounted in said housing, a work-gripping jaw mounted reciprocably on each carrier for rectilinear movement in a direction radial of the pivotal axis of the associated carrier, means for pressing the several jaws into work-holding position and for equalizing the pressure thereon, and means operatively connected to the several carriers for rocking said carriers simultaneously about their pivots to move the jaws simultaneously into operative relation with the work and to simultaneously retract the carriers therefrom depending upon the direction of movement of said last-named means, and bumpers for resiliently stopping the movement of the carriers in both directions.

14. A chuck comprising a housing adapted to be secured to the work spindle of a machine to rotate with said work spindle, a plurality of carriers pivotally mounted in said housing, a brake drum rotatably mounted on said housing, pin and block connections between the brake drum and the several carriers comprising a pin secured to each carrier, a block rotatably mounted on each pin and slidable in an elongate slot in the brake drum, a work-gripping jaw movably mounted on each carrier, means for moving said jaws on said carriers toward work-engaging position, a brake engageable with said brake drum, and means for moving said brake into engagement with said brake drum.

15. A chuck comprising a carrier having two parallel cylinders, a pair of pistons reciprocable in said cylinders, an enlarged head secured to the two pistons and having a channel extending across the front face thereof perpendicular to the two pistons, a work-gripping jaw, and means for removably securing said jaw in said channel.

16. A chuck comprising a carrier having two parallel cylinders, a pair of pistons reciprocable in said cylinders, an enlarged head secured to the two pistons and having a channel extending across the front face thereof perpendicular to the two pistons, said channel having a plane bottom, said head having a plane seating surface at one end extending at right angles to said bottom, a work-gripping jaw having two plane surfaces extending at right angles to each other and adapted to seat, respectively, against said bottom and the first-named seating surface, and a holding screw extending through said jaw and threading into said head, said screw extending in a direction bisecting the angle between the plane bottom and said first-named seating surface of said head.

17. A chuck comprising a housing adapted to be secured to the work spindle of a machine to rotate with said work spindle, a plurality of carriers pivotally mounted in said housing, a work-gripping jaw movably mounted on each carrier, means for moving said jaws to work-engaging position, a brake drum rotatably mounted on said housing, pin and block connections between the brake drum and the several carriers comprising a pin secured to each carrier, and a block rotatably mounted on each pin and slidable in an elongate slot in said brake drum, a brake engageable with said brake drum to cause relative movement between said brake drum and said housing and movement of said carriers to and from operative position, means for engaging said brake with said brake drum, and means for stopping movement of said carriers in opposite directions in said housing, said last-named means comprising a pin secured in said housing, and a resilient bumper mounted on said pin, said brake drum having an arcuate slot therein in which said bumper travels.

18. A chuck comprising a housing adapted to be secured to the work spindle of a machine to rotate with said work spindle, a plurality of carriers pivotally mounted in said housing, a work-gripping jaw movably mounted on each carrier, means for moving said jaws to work-engaging position, a brake drum rotatably mounted on said housing, pin and block connections between the brake drum and the several carriers comprising a pin secured to each carrier, and a block rotatably mounted on each pin and slidable in an elongate slot in said brake drum, a brake engageable with said brake drum to cause relative movement between said brake drum and said housing and movement of said carriers to and from operative position, means for engaging said brake with said brake drum, and means for stopping movement of said carriers in opposite directions in said housing, said last-named means comprising a pin secured in said housing, and a resilient bumper mounted on said pin, said brake drum having an arcuate slot therein in which said bumper travels, and means for locking each carrier in and out of work-engaging position comprising a toggle member pivotally connected at one end to said housing and pivotally connected at its opposite end to the carrier at a point offset from the pivot of said carrier, said toggle member comprising two axially telescoping members and a spring interposed between them.

19. A chuck comprising a housing adapted to be secured to the work spindle of a machine to rotate with said work spindle, a plurality of carriers pivotally mounted in said housing, each having a pair of parallel cylinders, a pair of pistons reciprocable in the cylinders of each carrier, a work-gripping jaw secured to each pair of pistons, spring means for urging each pair of pistons in one direction to urge the jaw carried thereby away from work-engaging position, each pair of pistons being urged in the opposite direction by fluid-pressure, means connecting all said cylinders together so that they constitute a closed hydraulic system, a brake drum rotatably mounted on said carrier, pin and block connections for connecting said brake drum to said carriers to move the carriers to and from working position on movement of the brake drum relative to the housing in opposite directions, said connections comprising a pin secured to each carrier and movable in an arcuate slot in said housing, and a block rotatably mounted on each pin and slidable in an elongate slot in said brake drum, a brake engageable with said brake drum to cause relative movement between said brake drum and said housing, means for engaging said brake with said brake drum, and a spring-actuated toggle member for releasably locking each carrier in and out of operative position, each toggle member being connected to each carrier at one end at a point offset from the pivot of said carrier and being connected at its opposite end to said housing.

20. A chuck comprising a support, a plurality of carriers pivotally mounted on said support, a member reciprocable in each carrier, a work-gripping jaw secured to each said member, each said jaw having a work-engaging face which is eccentric of the pivot of the carrier on which the jaw is supported, means for simultaneously swinging the several carriers about their pivots to move the jaws into work-engaging position, means for pressing the jaws into gripping engagement with the work and means for equalizing the pressure on the several jaws.

21. A chuck comprising a support, a plurality of carriers pivotally mounted on said support, each of said carriers being provided with a cylinder, a piston reciprocable in said cylinder and having one end projecting from said support, a work-gripping jaw secured to the said one end of each piston, each said jaw having a work-engaging face which is eccentric of the pivot of the carrier on which the jaw is supported, means for simultaneously swinging the several carriers about their pivots to move the jaws into work-engaging position, and means connecting the several cylinders in a closed hydraulic system to equalize the pressure on the several jaws.

22. A chuck comprising a support, a plurality of carriers pivotally mounted on said support, each of said carriers being provided with a cylinder, a piston reciprocable in said cylinder, a work-gripping jaw secured to one end of each piston, each said jaw having a work-engaging face which is eccentric of the pivot of the carrier on which the jaw is supported, means for simultaneously swinging the several carriers about their pivots to move the jaws into or away from work-engaging position, and means connecting the several cylinders in a closed hydraulic system to equalize the pressure on the several jaws, said last-named means including a toggle linkage connecting each carrier with the support to hold the jaws in closed, work-engaging position when the carriers are swung in one direction about their pivots and to hold the jaws open when the carriers are swung in the opposite direction.

23. A chuck comprising a housing adapted to be secured to the work spindle of a machine to rotate with said work spindle, a plurality of carriers pivotally mounted in said housing, each having a cylinder thereon, a piston reciprocable in each cylinder, a work-gripping jaw secured to one end of each piston, each said jaw having a work-engaging face which is eccentric of the pivot of the carrier on which the jaw is supported, a brake drum rotatably mounted on said housing, a brake engageable with said brake drum to cause relative rotary movement between said brake drum and said housing, means for engaging said brake with said brake drum, means connecting said brake drum to the several carriers to swing the several carriers about their pivots on engagement of said brake with said drum, and means connecting the several cylinders in a closed hydraulic system to equalize the work-gripping pressure on the several jaws.

24. A chuck comprising a housing adapted to be secured to the work spindle of a machine to rotate with said work spindle, a plurality of carriers pivotally mounted in said housing, each having a cylinder thereon, a piston reciprocable in each cylinder, a work-gripping jaw secured to each piston, each said jaw having a work-engaging face which is eccentric of the pivot of the carrier on which the jaw is supported, resilient means urging each piston in one direction to urge its jaw away from work-engaging position, means connecting the several cylinders together in a closed hydraulic system to apply equal pressure to the several pistons in the opposite direction, a brake drum rotatably mounted on said housing, a brake engageable with said brake drum to cause relative rotary movement between said brake drum and said housing, means for engaging said brake with said brake drum, means connecting said brake drum to the several carriers to swing the several carriers about their pivots on engagement of said brake with said drum, and a plurality of toggle linkages, each pivotally connected at one end to one carrier and at its opposite end to said housing to hold the jaws in closed work-engaging position when the carriers are swung in one direction about their pivots and to hold the jaws open when the carriers are swung in the opposite direction.

WORTHY J. F. FORWARD.

References Cited in the file of this patent

UNITED STATES PATENTS

| Number | Name | Date |
|---|---|---|
| 1,522,115 | Gosselin | Jan. 6, 1925 |
| 2,158,058 | Godfriaux | May 16, 1939 |
| 2,188,095 | Hartsuff | Jan. 23, 1940 |
| 2,323,091 | Johnston et al. | June 29, 1943 |
| 2,479,560 | Eaton | Aug. 23, 1949 |
| 2,578,245 | Heaton | Dec. 11, 1951 |
| 2,587,893 | Pridy et al. | Mar. 4, 1952 |